United States Patent

[11] 3,537,533

[72] Inventors Earl P. Morehouse;
Marvin L. Johnson, Bristol, South Dakota
[21] Appl. No. 722,520
[22] Filed March 28, 1968
Continuation-in-part of Ser. No. 574,162,
Aug. 22, 1966, abandoned.
[45] Patented Nov. 3, 1970
[73] Assignee Deere & Company
Moline, Illinois
a corporation of Delaware

[54] AUTOMATIC MARKER CHANGERS FOR FARM IMPLEMENTS
10 Claims, 7 Drawing Figs.
[52] U.S. Cl. .................................................. 172/130, 111/33
[51] Int. Cl. ..................................................... A01b 35/32
[50] Field of Search ........................................... 172/130, 126, 127, 129; 111/33

[56] References Cited
UNITED STATES PATENTS
1,888,502 11/1932 Holstein ........................ 172/130
2,362,693 11/1944 Haas .............................. 172/130
3,021,905 2/1962 Quibell .......................... 172/255X
3,107,734 10/1963 Richman ....................... 111/33X Primary Examiner—Robert E. Pulfrey
Assistant Examiner—Ronald C. Harrington
Attorney—H. Vincent Harsha, Harold M. Knoth, William A. Murray and John M. Nolan ABSTRACT: A marker changer for grain drills having a pair of markers. One end of an arm is mounted on a caster wheel to the front of the drill, the other end of the arm being secured to an intermediate portion of a cable whose ends are connected to the markers. Turning of the grain drill towards the down marker will cause the caster wheel to swivel, which will in turn cause the cable to pull up the down marker, the other marker being permitted to fall to its marking position.

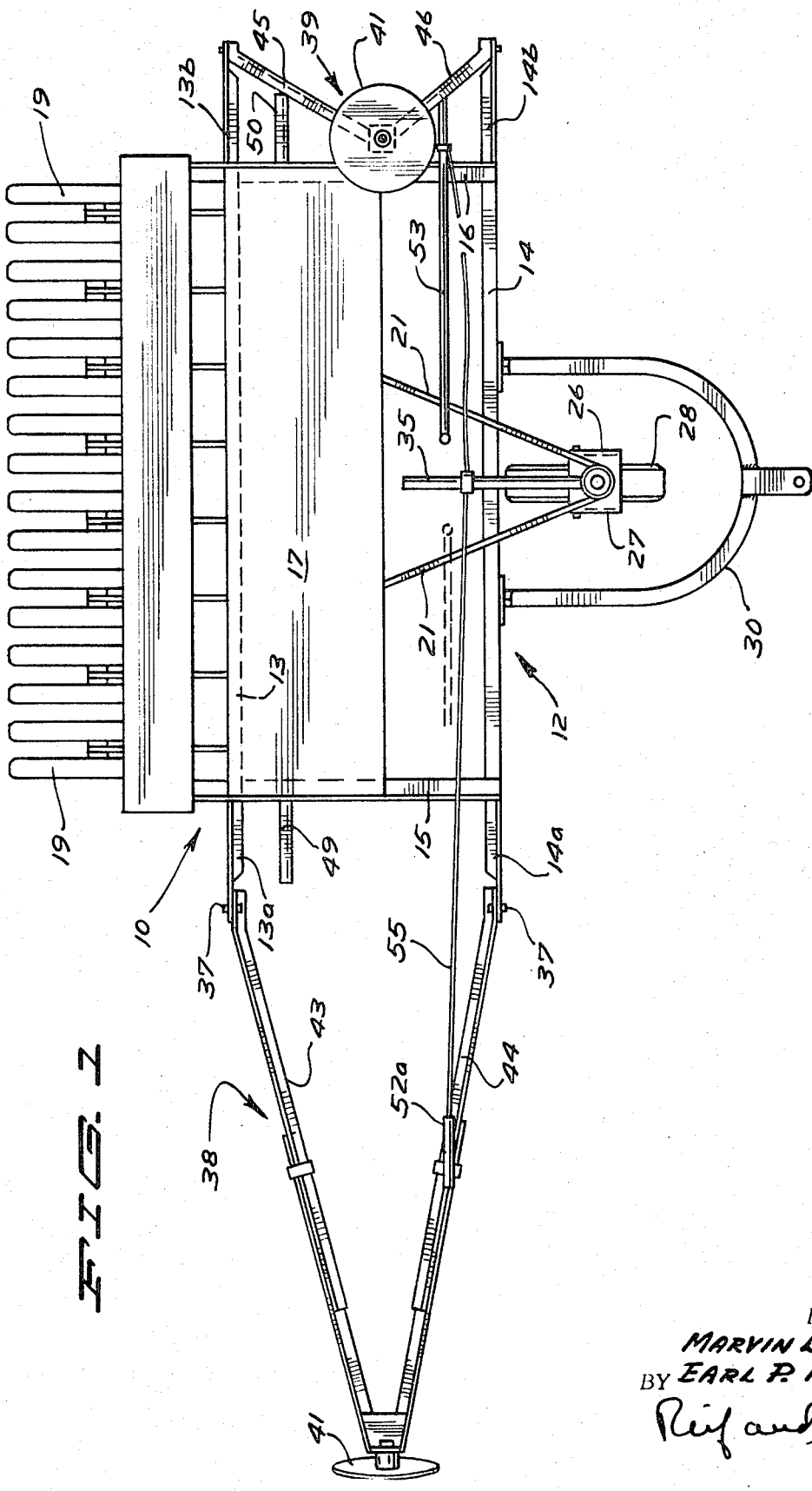

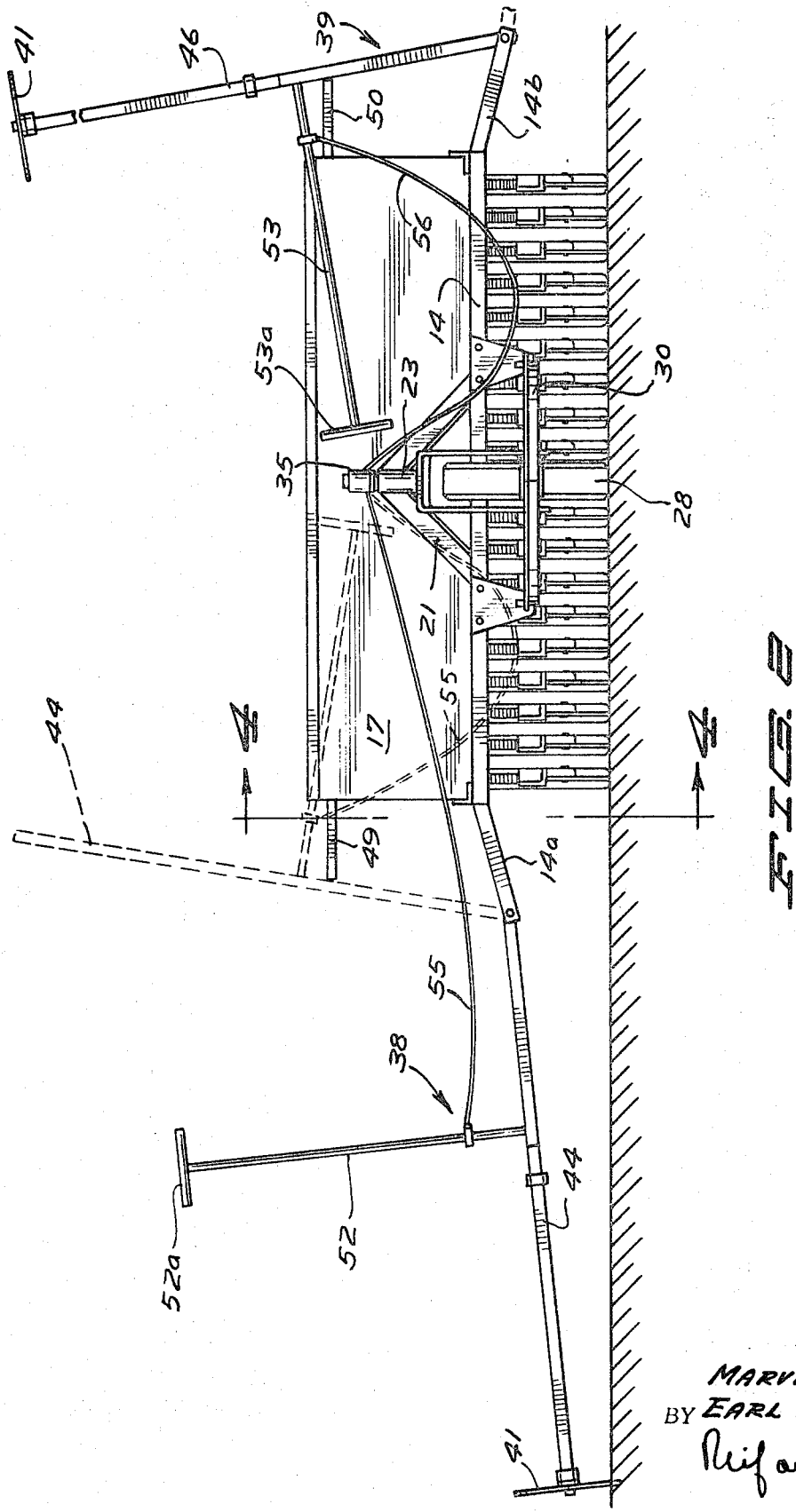

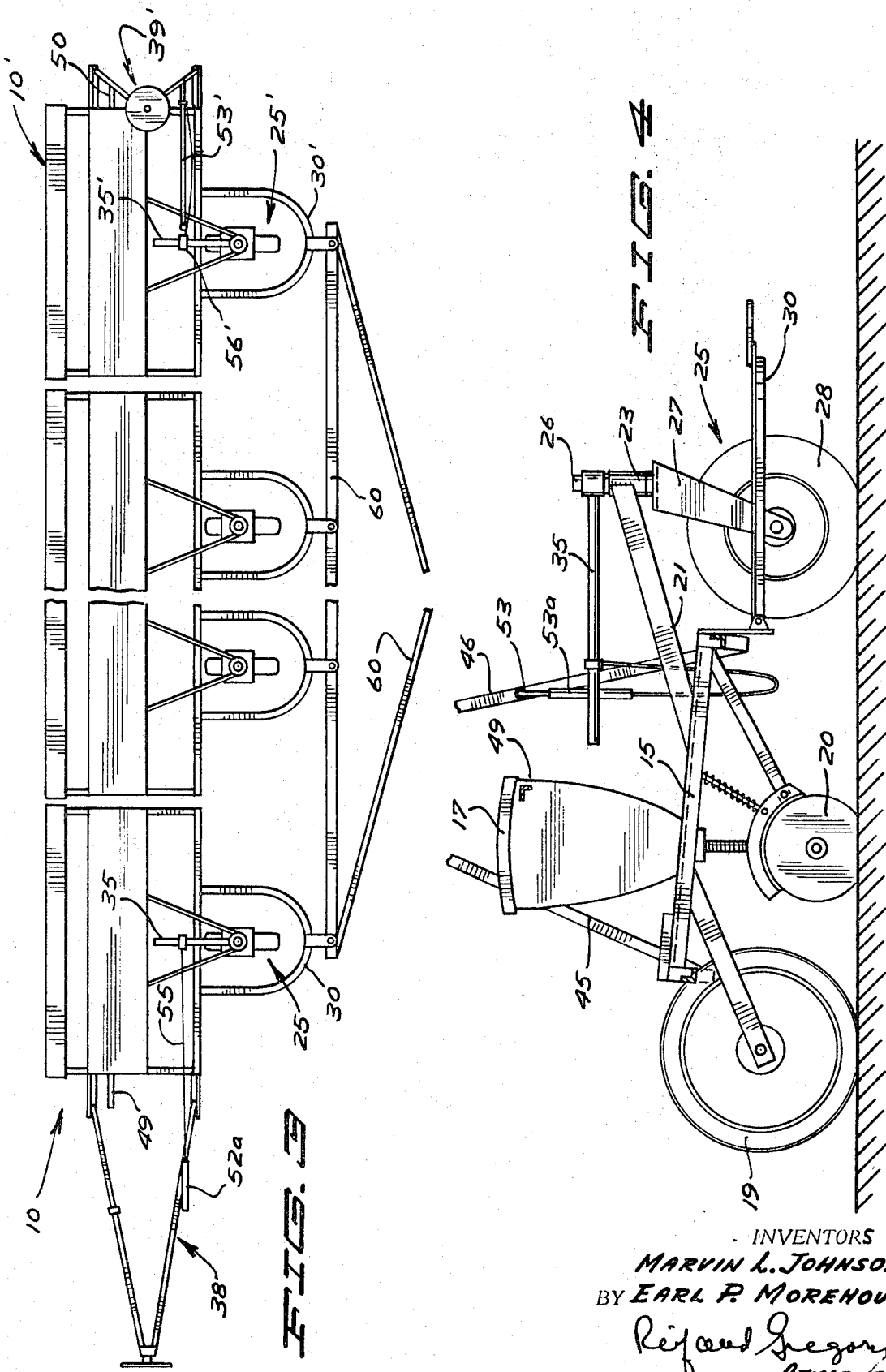

INVENTORS
EARL P. MOREHOUSE &
MARVIN L. JOHNSON

INVENTORS
EARL P. MOREHOUSE &
MARVIN L. JOHNSON 3,537,533

AUTOMATIC MARKER CHANGERS FOR FARM IMPLEMENTS

CROSS-REFERENCE TO RELATED APPLICATIONS

This application is a continuation-in-part of applicants' copending application Ser. No. 574,162, filed 22 Aug. 1966, now abandoned.

FIELD OF THE INVENTION

This invention relates to improvement in apparatus for automatically changing the markers of an agricultural implement.

DESCRIPTION OF THE PRIOR ART

There are several control means known in the art for changing the markers of an implement. These require manual control or are controlled by the tractor used, and in some instances the markers are connected to one another as by a cable. Reference is had to U. S. Letters Pat. Nos. 3,146,833; 2,537,543; 2,546,412; 3,101,787; 3,021,905; 1,888,502 and 2,362,693.

SUMMARY OF THE INVENTION

It is an object of the invention herein to provide a simply constructed apparatus for automatically changing the markers of an implement by action of the implement itself free from control of the tractor pulling the implement and free from manual control.

It is another object of the invention herein to provide control means for changing markers whereas the markers are independent of one another and are controlled by the implement upon a change of direction of travel of the implement.

More specifically it is an object of one modification of the invention herein to provide means for changing markers in connection with an implement equipped with a leading caster or swivel wheel wherein a rigid actuating arm is attached to said caster wheel, a flexible member connects said actuating arm and a rigid member is used for engagement between said marker and said actuating arm whereby said actuating arm upon swinging laterally respectively pulls one marker and pushes the other to respectively change their positions.

It is an object of another modification of the invention herein to provide means for changing markers on an implement equipped with a leading caster or swivel wheel wherein a rigid actuating arm is attached to said caster wheel, there being a cable interconnecting the markers on the implement and of such length that only one marker may be in the marking position, said arm being connected to said cable and operable upon swiveling of the caster wheel to pull one marker to an inoperative position while permitting the other marker to fall to its marking position.

These and other objects and advantages of the invention will be set forth in the following description made in connection with the accompanying drawings in which like reference characters refer to similar parts throughout the several views of the drawings.

BRIEF DESCRIPTION OF THE DRAWINGS

FIG. 1 is a top plan view of an implement showing installed thereon a first form of the control means comprising the invention herein;

FIG. 2 is a view in front elevation of the invention shown in FIG. 1 with a portion thereof being shown in an alternate position in dotted line;

FIG. 3 is a broken view in plan showing a gang or plurality of implements embodying the use of the first form of the invention herein;

FIG. 4 is a view in vertical section taken on line 4—4 of FIG. 2 as indicated;

DESCRIPTION OF THE PREFERRED EMBODIMENTS

Figure 5:
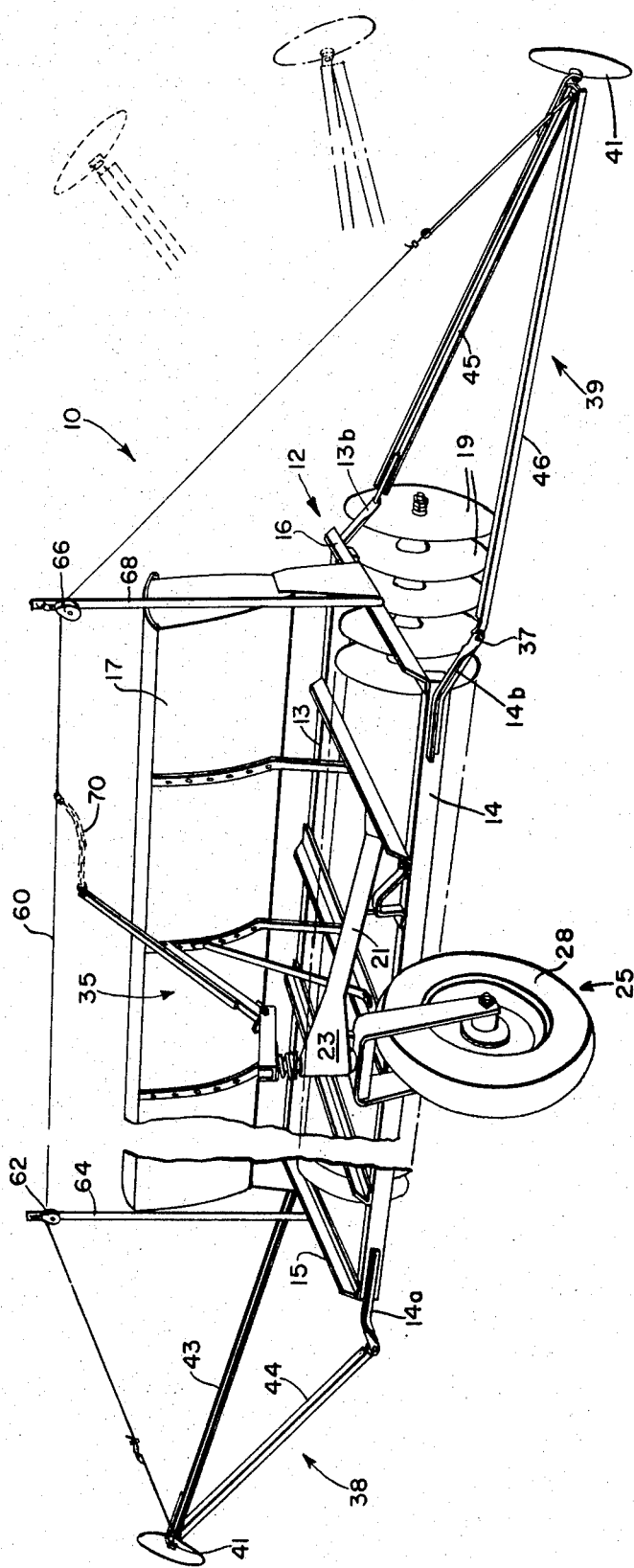
FIG. 5 is a perspective view of an implement showing installed thereon a second form of the control means of this invention, the implement swivel wheel being in its straight ahead position.

In the following description right-hand and left-hand reference is determined by standing to the rear of the implement and facing the direction of travel.

Referring to the drawings, an agricultural implement 10 is shown as representative of implements with which it is desirable to use markers. For the most part, such implements are planting or seeding implements. The implement here shown comprises a basic frame 12 having a rear frame member 13, a forward frame member 14 and right and left end frame members 15 and 16, respectively.

Carried on said frame is a conventional hopper 17 and mounted rearwardly of said frame are packing or press wheels 19. Carried under said hopper and conventionally secured to said frame are furrow openers which may be in the form of disc openers 20 (FIG. 4) or the conventional hoe openers.

Rigidly secured to said frame (as by welding) and extending forwardly thereof is a V-shaped frame supporting member 21 having a vertically disposed hub or sleeve 23 at its apex forming a bearing. A caster or swivel wheel assembly 25 is mounted with a vertically extending shaft 26 journaled into said hub and extending somewhat thereabove. Depending from said shaft is a fork 27 having journaled therein a wheel 28.

A tow member in the form of a bail 30 (FIG. 1) may extend forwardly from said frame 10 about said swivel wheel, and to this may be attached the drawbar of a tractor.

Secured to the upwardly extending portion of said shaft 26 to be rigid therewith and extending rearwardly of said swivel wheel assembly 25 normal to the axis thereof is an actuating arm 35.

Said rearward and forward frame members 13 and 14 have laterally extending downwardly inclined right end portions 13a–14 and left end portions 13b–14b, respectively. Pivoted to said end portions 13a and 14a by bolts or rivets 37 is a marker 38, and pivoted to the end portions 13b and 14b in like manner is a marker 39.

Said markers may be variously designed. The specific design of the markers shown here forms no part of this invention. Said markers are shown here carrying ground-engaging discs 41 at their respective free ends and are shown being of a general V-shape in plan having arms 43–44 and 45–46, respectively. Said markers will be in operative position when in a ground-engaging position and will be in inoperative position when in a raised position. The markers for the implement shown in FIGS. 1—4 will be inclined inwardly of the adjacent ends of the frame to an over center position when they are in their fully raised position, the markers engaging the marker support or stop bars 49 and 50 which extend outwardly from either end of the hopper structure.

In the form of invention shown in FIGS. 1—4 the forward arm 44 of the marker 38 is provided with an arm 52 extending upwardly and at right angles to the arm 44. The arm has at its free end a crossbar 52a. Said crossbar will be vertically disposed when said marker arm is in a generally horizontal position. A marker arm 53 is similarly carried by the forward arm 46 of the marker 39 and has at its free end a crossbar 53a.

Connecting said marker arm 52 and said actuating arm 35 is a flexible member 55 which may be in the form of a cable or chain. In like manner a flexible member 56 connects said marker arm 53 and said actuating arm 35. With reference to FIG. 2, with a marker in ground-engaging position, its flexible member will be in a fairly taut condition having a small degree of slack therein. With a marker in raised or inoperative position, its flexible member will be in a substantially slack position, as is quite apparent.

The marker arms 52 and 53 will be of such length with regard to their respective positions longitudinally of said markers 38 and 39, that when a marker is in inoperative position as shown in FIG. 2, the actuating arm upon swinging laterally with the turning of the swivel wheel, will engage the respective crossbar 52a, 53a and push the marker arm thereof a sufficient distance to move the marker beyond an over center position to the point where said marker will drop to a ground-engaging operative position.

In a related manner, the flexible members 55 and 56 will be of such length with respect to the positions of the marker arms that a lateral swinging action of the actuating arm in connection with a directional change of the swivel wheel, will pull a marker to an upward over center inoperative position.

It will be understood that the extent of directional change necessary for a change of the markers will be related to the positions of the marker arms and their respective lengths and the lengths of the flexible members. These things are matters to be determined by the operator.

The markers are changed automatically by a directional turn of the swivel wheel 25. In the operation of an implement, which generally will be a seeding implement, the planting will be done in parallel rows formed by the implement reversing its direction 180° at the end of each row. The implement may also be operated where its directional turn may only be on the order of 90°. The length of the marker arms and their location on the markers together with the length of the flexible members will be such as to provide for the changing of the markers in a range of directional turn as from approximately 90° to 180°.

It will be understood that the first form of the invention herein also embodies the scope of having a pair of swivel wheels on an implement with the marker at each end of the implement being connected to and operated by its adjacent swivel wheel and with the changing of both markers being coordinated by the fact that the swivel wheels both turn in the same direction at the same time.

With reference to FIG. 3, a plurality of laterally aligned or a gang of identical implements are shown with one end implement, indicated by the character 10, showing the marker 38 mounted thereon as above described, and the other end implement 10' has mounted on the free end thereof the marker 39' which is identical to the marker 39 as described. The same cooperating elements are used with the implement 10' and have the same characters as like parts above described with a prime added. This arrangement embodies the use of separate swivel wheels for the changing of the markers.

With respect to an implement or a gang of implements as the case may be, the marker at the end making the sweep of the turn will be pushed to ground-engaging operating position and the marker at the pivot end of the implement will be pulled up to a raised inoperative position.

Figure 6:
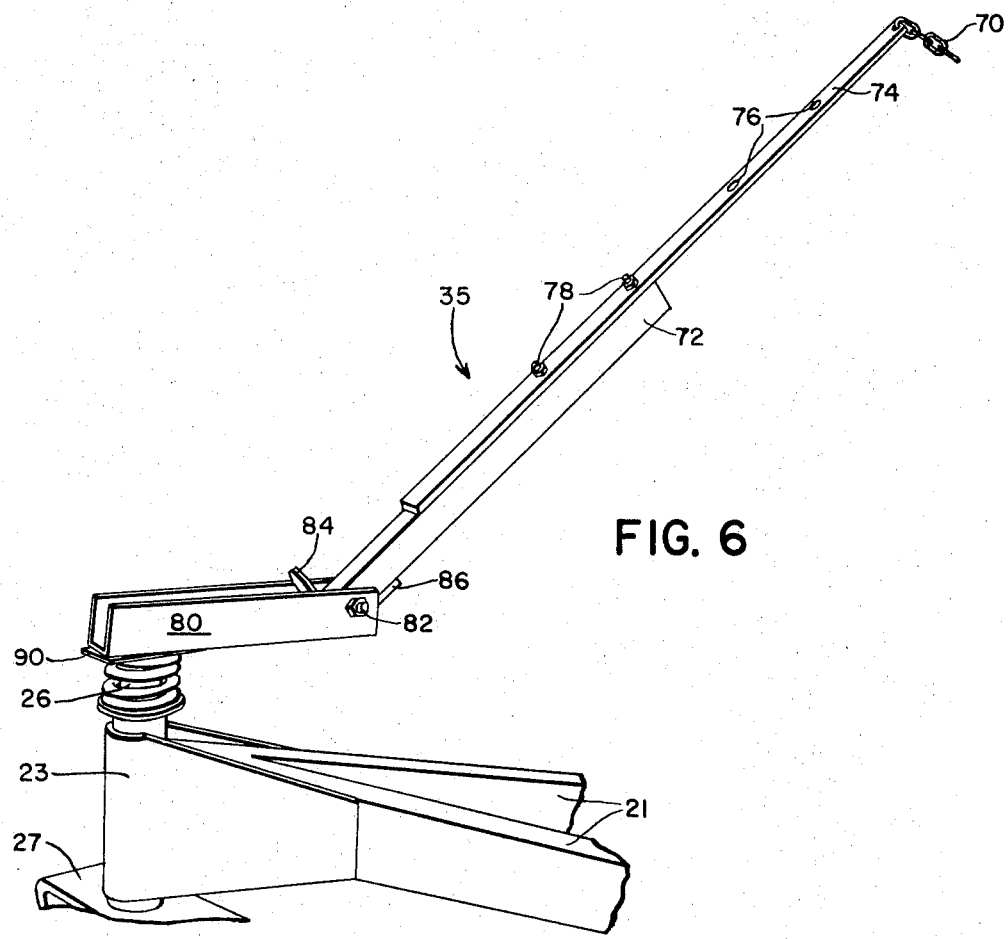
FIG. 6 is an enlarged perspective view of the actuating arm shown in FIG. 5.
Figure 7:
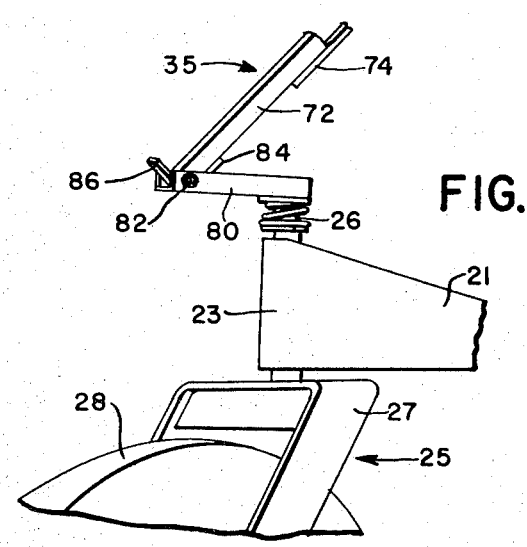
FIG. 7 is an enlarged perspective view of a portion of the actuating arm and swivel wheel showing the position they assume when the implement is being backed up.

In the form of the invention shown in FIGS. 5—7, the markers are interconnected to each other in a conventional manner by a cable 60. In this form the two markers move together from a stable position, where one marker is down and the other raised, through a balanced position shown in dot-dash lines in FIG. 5, where both members are about halfway between their lowered operative position and raised inoperative position, to another stable position shown in the dot-dot lines in FIG. 5, where said one marker is raised and said other marker is lowered. If the markers are between the balanced position and either the raised or lowered position, they are in an unstable position. Thus, if neither of the markers are touching the ground and if one is lower than the other, they will be in an unstable position and the lower member, which has a greater moment arm about the pivot bolt 37, will swing down until it engages the ground, drawing up the other marker to its raised inoperative stable position.

The cable 60 is secured at one end to the outer end of the marker 38 and passes over first and second sheaves 62, 66, and the other end of the cable 60 is secured to the marker 39. The first sheave 62 is carried by an upstanding arm 64 whose lower end is secured to the end frame member 15. The second sheave 66 is carried by an upstanding arm 68 whose lower end is secured to the end frame member 16.

The actuating arm 35, when used with an implement having its members interconnected in this manner, is secured to a portion of the cable 60 between the sheaves 62, 66 by a chain 70. The rear end of the chain is preferably secured to that portion of the cable directly behind the arm 35 when the swivel wheel is in a straight-ahead position and the markers are in a balanced position. The length of the chain is determined by the operator and it should be long enough to permit limited swiveling of the wheel 25 while short enough to insure that the lower marker is raised past the balanced position when the grain drill is turned toward the lowered marker at the end of the field.

The actuating arm assembly 35 includes a tubular member 72 and an extension member 74 having a plurality of spaced apertures 76 by which it may be adjustably secured to the member 72 by bolts 78. The arm 72, 74 is secured to a channel-shaped member 80 by means of a pivot bolt 82. A pair of stops 84, 86 are welded in the channel member 80 and the arm 72, 74 may pivot between the stops. Thus, when the wheel assembly 25 turns more than 90° from its normal straight-ahead position, shown in FIG. 5, the arm 72, 74 may swing from engagement with the stop 86 (FIG. 5) to a position where it engages the stop 84 (FIG. 7).

The channel member 80 is secured to a base plate 90 for adjustable rotational positioning. The base plate 90 is in turn rigidly secured to the spindle shaft 26.

While the form of marker shown in FIGS. 5—7 is only illustrated in conjunction with a single swivel wheel, it should be observed that the grain drill illustrated in FIG. 5 may be provided with a second swivel wheel. When two or more grain drills are hooked up in side-to-side fashion, it may be desirable to employ a second actuating arm since the wheel nearest the lowered marker will turn more as the implement is turned toward the lowered marker. Thus, two actuating arms may be employed with this form in the manner shown in FIG. 3, with the cable 60 still interconnecting one marker with the other.

While the preferred structures in which the principles of the present invention have been incorporated are shown and described above, it is to be understood that the invention is not to be limited to the particular details, shown and described above, but that, in fact, widely different means may be employed in the practice of the broader aspects of the invention.

I claim:

1. In combination with a grain drill having a frame with forward hitch means adapted for connection to a tractor, press wheel means to the rear of the frame, a swivel wheel castored to the front of the frame in fore-and-aft alignment with the hitch means, right and left markers carried at the sides of the frame for swinging movement between a lowered marking position and a raised inoperative position, and cable means secured to each of said markers and extending towards the other of said markers, a marker changing apparatus including: an actuating arm carried by said swivel wheel for movement with the wheel as the wheel castors in response to turning of the implement, said arm extending rearwardly when the swivel wheel is disposed for forward movement of the grain drill, and means connecting said cable means with said arm, the cable means and arm being of such length that as the grain drill is turned toward the lowered marker at the end of the field the rear end of the actuating arm will swing away from the lowered marker causing it to be raised while permitting the raised marker to be lowered.

2. A marker changing apparatus for an agricultural implement having a frame and a shaft supported swivel wheel extending forwardly of said frame having in combination, a pair of markers, means respectively swingably supporting said markers adjacent either end of said frame, said markers being operative when in ground-engaging position and being inoperative when in elevated position, an actuating arm carried by and extending rearwardly of said swivel wheel normal to the axis thereof, flexible means connecting each of said markers with said actuating arm, rigid means carried by each of said markers for engagement by said actuating arm, and said flexible means and said rigid means respectively being arranged and constructed to be operated by said actuating arm to raise an operative marker to inoperative position and to lower an inoperative marker to operative position simultaneously.

3. The structure set forth in claim 2, wherein said rigid means comprises an arm upstanding from each of said markers, and said arms are of such a length that when respectively engaged by said actuating arm, they are moved a sufficient distance to swing their respective markers to over center positions away from said frame whereby said markers respectively will fall to ground-engaging operative position.

4. The structure set forth in claim 3, wherein each of said arms have crossbars adjacent their respective free ends.

5. The structure set forth in claim 2, wherein said actuating arm is secured to said shaft of said swivel wheel for lateral movement with the directional turn of said swivel wheel.

6. A marker changing apparatus for an agricultural implement having a frame and a shaft supported swivel wheel extending forwardly of said frame having in combination, a pair of markers, means respectively swingably supporting said markers adjacent either end of said frame, said markers being operative in ground-engaging position and being inoperative in elevated position, a marker arm upstanding from each of said markers, an actuating arm carried by said swivel wheel and extending rearwardly thereof normal to the axis thereof and being adapted to move laterally with a directional turn of said wheel, a flexible member connecting each of said markers with said actuating arm, and said flexible members and said marker arms each being of such a length that when said swivel wheel is turned to change the direction of travel of said implement, said flexible member connected to the ground-engaging marker at the pivot of the turn is pulled up by the swing of said actuating arm to inoperative position, and the marker arm of the other of said markers which moves through the sweep of the turn is engaged by said swinging actuating arm and is pushed to swing said last-mentioned marker to a ground-engaging operative position.

7. In combination with a grain drill having a frame with forward hitch means adapted for connection to a tractor, a swivel wheel assembly castored on the front of the frame in fore-and-aft alignment with the hitch means, and right and left markers carried at the sides of the frame for swinging movement between a lowered marking position and a raised inoperative position, said markers being interconnected by a cable disposed over said frame and operative to cause one marker to be raised as the other is lowered, the markers as they move between their raised and lowered positions passing through unstable positions to either side of an intermediate balanced position, the one marker being lower than the other in the unstable position and operative to swing down to the ground-engaging position causing the other marker to be moved to its fully raised position; a marker changing apparatus including: an actuating arm, means securing said actuating arm to said swivel wheel assembly for castoring therewith in response to turning of the implement, said arm extending rearwardly when the swivel wheel assembly is disposed for forward movement of the grain drill, and flexible means connecting said cable with said arm and of such length that when the grain drill is turned toward the lowered marker said marker is raised through the balanced position to an unstable position.

8. The combination set forth in claim 7 in which said securing means includes a member mounted on said swivel wheel assembly, pivot means passing through said member and said arm and operative to normally hold said arm for fore-and-aft swinging movement, and stop means on said member to limit the swinging of said arm.

9. The combination set forth in claim 7 in which said grain drill has press wheel means to the rear of said frame, said frame being supported by said press wheel means and said swivel wheel means.

10. The combination set forth in claim 7 in which said actuating arm is formed of two members, one of said members being secured to the other for adjustable positioning whereby the length of the actuating arm may be varied.